(12) United States Patent
Nakayama et al.

(10) Patent No.: US 7,400,319 B2
(45) Date of Patent: Jul. 15, 2008

(54) TABLET APPARATUS (75) Inventors: Naomi Nakayama, Nei-gun (JP); Kazuo Imai, Nei-gun (JP); Yoshiaki Yamaguchi, Nei-gun (JP); Isamu Saito, Nei-gun (JP)

(73) Assignee: SMK Corporation, Tokyo (JP)

( * ) Notice: Subject to any disclaimer, the term of this patent is extended or adjusted under 35 U.S.C. 154(b) by 616 days.

(21) Appl. No.: 11/051,289

(22) Filed: Feb. 4, 2005

(65) Prior Publication Data
US 2005/0174336 A1 Aug. 11, 2005

(30) Foreign Application Priority Data
Feb. 5, 2004 (JP) ............................. 2004-029715

(51) Int. Cl.
G06F 3/043 (2006.01)
(52) U.S. Cl. .................. 345/177; 345/173; 345/174; 178/18.03; 178/18.04; 178/18.05; 178/18.06; 178/18.07
(58) Field of Classification Search ......... 345/173–178; 178/18.01, 18.03–18.09, 18.11
See application file for complete search history.

(56) References Cited

U.S. PATENT DOCUMENTS

| 6,005,327 | A  | * | 12/1999 | Toda ..................... 310/313 R |
| 6,590,569 | B1 | * | 7/2003 | Toda ........................ 345/173 |
| 6,593,917 | B2 | * | 7/2003 | Toda ........................ 345/173 |
| 7,119,798 | B2 | * | 10/2006 | Yoshikawa et al. .......... 345/173 |
| 7,215,329 | B2 | * | 5/2007 | Yoshikawa et al. .......... 345/173 |
| 7,227,537 | B2 | * | 6/2007 | Nakayama et al. .......... 345/173 |
| 2003/0067449 | A1 |  | 4/2003 | Yoshikawa et al. |
| 2005/0219230 | A1 | * | 10/2005 | Nakayama et al. .......... 345/173 |

FOREIGN PATENT DOCUMENTS

| EP | 1 411 423 A2 | 4/2004 |
| EP | 1 544 720 A1 | 6/2005 |
| JP | 3-6731 | 1/1991 |
| JP | 5-53715 | 3/1993 |
| JP | 5-33235 | 4/1993 |
| JP | 5-289806 | 11/1993 |
| JP | 6-242875 | 9/1994 |
| JP | 11-212725 | 8/1999 |
| JP | 2000-269563 | 9/2000 |
| JP | 2003-122507 | 4/2003 |
| WO | WO 2004/021160 A1 | 3/2004 |

* cited by examiner

Primary Examiner—My-Chau T Tran
(74) Attorney, Agent, or Firm—Pearne & Gordon LLP

(57) ABSTRACT

A pair of piezoelectric substrates, the length of which is shorter than the length of one side in the longitudinal direction of the operation panel or the supporting board, is respectively fixed to one side from the diagonal position along the longitudinal direction. At the time of detecting an inputting operation, a drive voltage is applied and the entire operation panel or the supporting board is vibrated. Even when the four corners of the operation panel or the supporting board are supported by the housing for accommodating the tablet apparatus or supported by the display device so that the vibration of the four corners is restricted, since either of the pair of piezoelectric substrates, which becomes a vibration source, a feeling of inputting operation can be transmitted to an operator by the vibration, the amplitude of which is not less than a predetermined value, irrespective of the inputting operation position.

10 Claims, 6 Drawing Sheets

PRIOR ART

Fig.8

PRIOR ART

Fig.9

PRIOR ART

TABLET APPARATUS

BACKGROUND OF THE INVENTION

The present invention relates to a tablet apparatus in which an operation panel or a supporting board for supporting the operation panel is vibrated when an inputting operation is conducted on the operation panel by an operator, so that the operator can have a feeling of inputting operation. More particularly, the present invention relates to a tablet apparatus in which an operation panel or a supporting board for supporting the operation panel is vibrated by a piezoelectric substrate.

The tablet apparatus is referred to as a digitizer, which is operated as follows. An indicating tool such as a stylus pen or a finger is made to come into contact with or come close to an operation panel supported by a supporting board. An input operating position on the operation panel, with which the indicating tool or the finer is made to come into contact or to which the indicating tool or the finger is made to come close to, is detected, and the input position data expressing the input operating position is outputted to a processing device such as a personal computer.

Especially when the operation panel, the supporting board, the insulating layer formed for detecting an input operating position and the electrode are made of transparent material, the tablet apparatus can be arranged on a display device such as a liquid crystal panel or CRT, and the inputting operation can be conducted on the inputting operation face of the tablet apparatus, that is, the inputting position data corresponding to a content on the display can be outputted into a processing device such as a personal computer while the operator is watching the content on the display.

Concerning the tablet apparatus, according to the system of detecting an input operating position on the operation panel, various tablet apparatus are proposed such as a magnetic coupling system disclosed in JP-A-5-289806, a capacity coupling system disclosed in JP-A-6-242875, a contact system disclosed in JP-UM-A-3-6731, a resistance system disclosed in JP-A-5-53715 and an optical coupling system disclosed in JP-UM-A-5-33235. However, in general, the operator can only know the result of operation by a processing device such as a personal computer, that is, it is impossible for the operator to know whether or not the inputting operation itself to the operation panel is detected by the tablet apparatus. Therefore, the operator feels uncertain about the inputting operation the operator has conducted.

The force feedback type tablet apparatus is known in which the operation panel of the supporting board is vibrated in response to the inputting operation so that the operator can feel that the inputting operation has been conducted into the tablet apparatus via a stylus pen or a finger, which comes into contact with the operation panel. Especially, the present applicant has developed a tablet apparatus in which the operation panel and the supporting board are effectively vibrated by a simple and compact structure in which a piezoelectric substrate is directly fixed to the operation panel or the supporting panel. Concerning this tablet apparatus, refer to Patent Document 1.

Patent Document 1: JP-A-2003-122507 (Abstract, FIG. 1)

Figure 7:
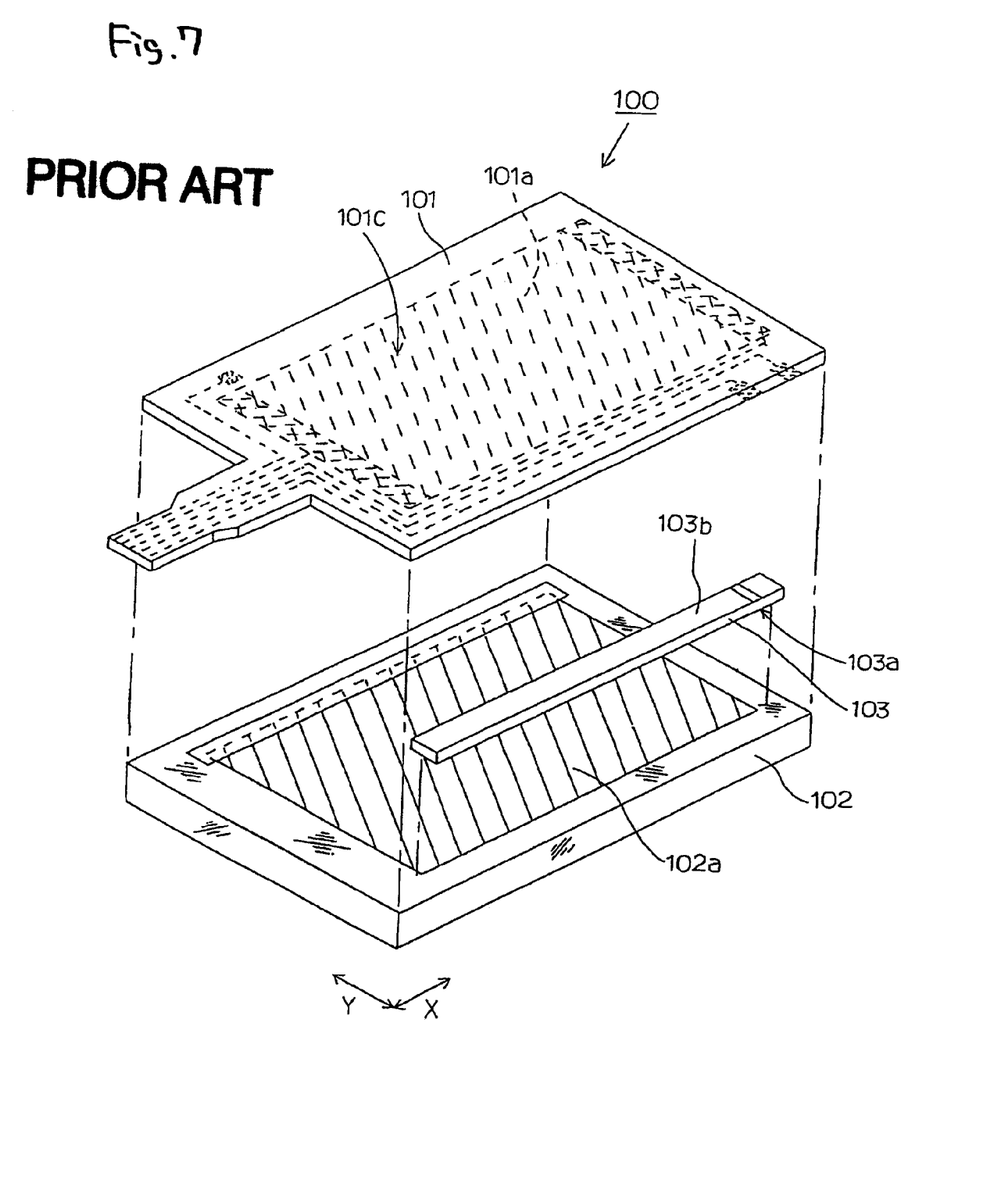
FIG. 7 is an exploded perspective view showing the conventional tablet apparatus 100.

FIG. 7 is a view showing this forced feedback type tablet apparatus 100, in which the operation panel 101 includes a flexible sheet made of plastics and the supporting board made of glass are laminated on each other leaving a small gap. In this structure, the tablet apparatus 100 is a resistance pressure sensitive system tablet apparatus, in which the conductive layers $101a$, $102a$ formed of uniform resistance films are provided on the opposed face on which the operation panel 101 and the supporting board 102 are opposed to each other and uniform electric potential gradients are alternately formed on the conductive layers $101a$, $102a$. When the inputting operation is conducted by pushing a surface of the operation panel 101, the conductive layers $101a$, $102a$ are contacted with and connected to each other at the input operating position, and an electric potential of the input operating position (the contact position) is read out from the other conductive layers $101a$, $102a$ on which the electric potential gradient is not formed. In this way, the inputting operation and the input operating position are detected.

The piezoelectric substrate 103 is formed into a long and slender shape. A pair of drive electrodes $103a$, $103b$ are provided on opposite faces of the piezoelectric substrate 103, and an entire face of one of opposite faces is fixed to the operation panel 101 or the supporting board 102 with adhesive. When it is detected that the inputting operation has been conducted on the inputting operation face $101c$ of the operation panel 101, a drive voltage is applied upon a pair of drive electrodes $103a$, $103b$. Due to the foregoing, the piezoelectric substrate 103 is expanded and contracted, and the operation panel 101 or the supporting board 102, to which the piezoelectric substrate 103 is fixed, is vibrated. By this vibration, the operator can confirm that the inputting operation has been accepted by the device.

According to this tablet apparatus 100, the long and slender piezoelectric substrate 103 is simply fixed to the operation panel 101 or the supporting board 102. Therefore, the entire structure can be made simple, and the operation panel 101 and the supporting board 102 can be vibrated by the simple structure without enlarging the size. Further, it is unnecessary to provide a vibration source and a transmission means for transmitting vibration from the vibration source to the operation panel 101 or the supporting board 102. Accordingly, it is possible to eliminate a loss of energy caused in the transmission of vibration. Further, it is possible to avoid the delay of transmission time of vibration.

Utilizing the electrostriction effect of the piezoelectric substrate 103 causes vibration of the operation panel 101 or the supporting board 102. A drive voltage is applied upon a pair of drive electrodes $103a$, $103b$, and one face of the piezoelectric substrate to expand and contract is fixed to the operation panel 101 or the supporting board 102, and the distortion is transmitted to the operation panel 101 or the supporting board 102, so that the operation panel 101 or the supporting board 102 can be vibrated.

By forming the piezoelectric substrate 103 into a long and slender shape, it is possible to obtain larger amplitude by a smaller quantity of vibration material. In the case where the operation panel 101 or the supporting board 102, to which the piezoelectric substrate 103 is fixed, is rectangular, when the long and slender piezoelectric substrate 103 is fixed along the longitudinal direction (direction X) as shown in FIG. 7, the operation panel 101 or the supporting board 102 can be vibrated by larger amplitude compared with the case where it is fixed along the lateral direction (direction Y).

On the other hand, concerning the fixing position of the piezoelectric substrate 103, an influence on the position detection of the inputting operating conducted on the inputting operation face $101c$ should be prevented and it should be avoided to arrange the piezoelectric substrate 103 below the inputting operation face $101c$ in the case of a tablet apparatus 100 made of transparent material because the operator is watching a display on the display device arranged on the back of the tablet apparatus to conduct the inputting operation.

Therefore, the fixing position of the piezoelectric substrate 103 is arranged on one side of the operation panel 101 or the supporting board 102 in the longitudinal direction.

For the reasons described above, as shown in FIG. 7, the piezoelectric substrate 103 is fixed to one side of the operation panel 101 or the supporting board 102 in the longitudinal direction. However, in the case where the tablet apparatus 100 is attached to a housing not shown or a display device such as a liquid crystal panel supported by the housing, in order to vibrate the device as entirely as possible, four corners of the operation panel 101 or the supporting board 102 are attached to the housing or the display device. Therefore, depending upon a position at which the input operation is conducted, the operator cannot sufficiently have a feeling of inputting operation by the vibration in some areas.

Figure 8:
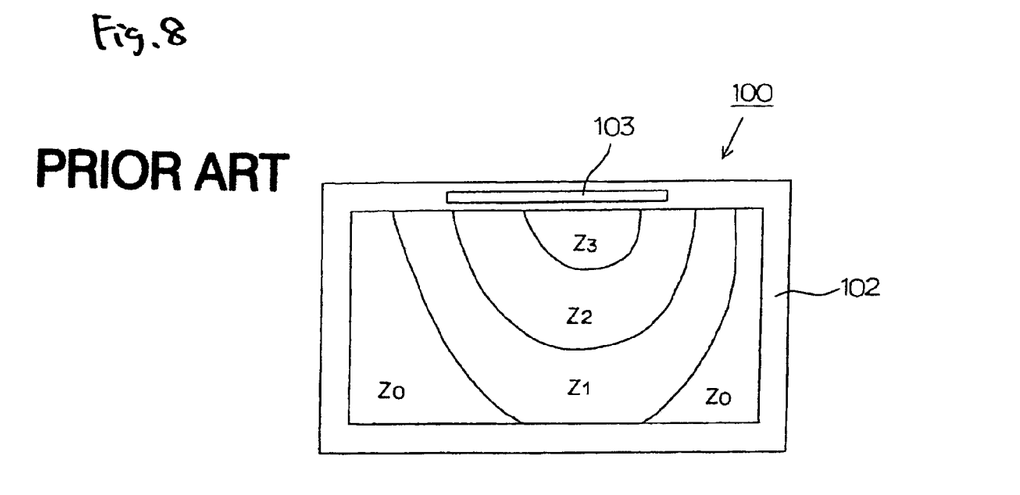
FIG. 8 is a schematic illustration showing amplitude z at each position on the supporting substrate 102 in the case where the supporting substrate 102 is vibrated, to one side in the longitudinal direction of which the piezoelectric substrate 103 is fixed.

FIG. 8 is a view showing the generation of vibration caused in the following circumstances. Under the condition of restricting the vibration of four corners, a drive voltage of 280V is applied upon the piezoelectric substrate 103 fixed to one side of the supporting board 102 in the longitudinal direction, and the supporting board 102 is vibrated. At this time, amplitude z at each position in direction Z perpendicular to the surface of the drawing is shown in FIG. 8. Amplitude z is increased in the order of z0, z1, z2 and z3. As can be seen in this drawing, amplitude z of the vibration generated on the supporting board 102 is largest at the center of the long and slender belt-shaped piezoelectric substrate 103. At a position distant from the center, amplitude z of the vibration generated on the supporting board 102 is reduced. Since the four corners are restricted, amplitude z in the vicinity of each corner is reduced. As a result, when the inputting operation is conducted on the left lower corner and the right lower corner, even if the supporting board 102 is vibrated, a sufficiently large vibration for the operator to have a feeling of inputting operation is not generated at the input operating position. Therefore, it is impossible for the operator to have a feeling of inputting operation.

Figure 9:
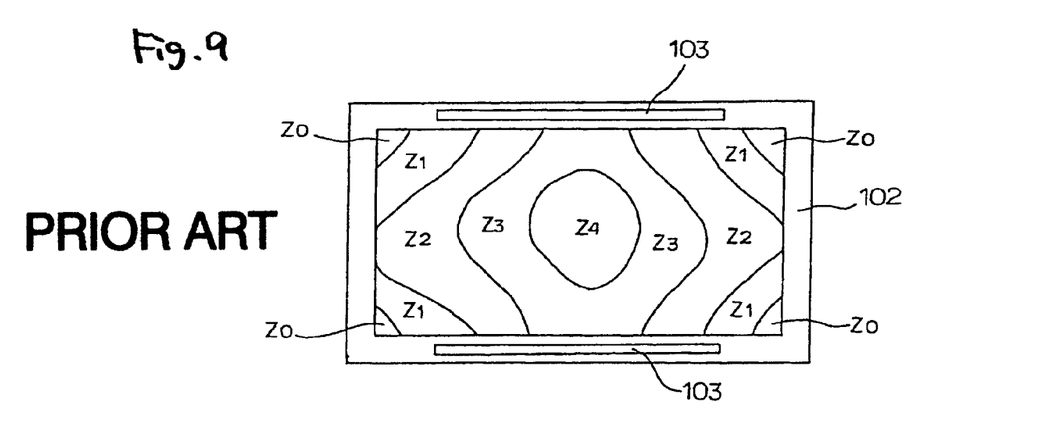
FIG. 9 is a schematic illustration showing amplitude z at each position on the supporting substrate 102 in the case where the supporting substrate 102 is vibrated, to opposite sides in the longitudinal direction of which a pair of piezoelectric substrates 103 are fixed.

Therefore, as shown in FIG. 9, the following attempt was made. A pair of piezoelectric substrates 103 is fixed to opposite sides of the supporting board 102 in the longitudinal direction, and the aforementioned non-sensitive region of one piezoelectric substrate 103 is compensated by the other piezoelectric substrate 103. FIG. 9 is a view showing a state in which a drive voltage is applied upon a pair of piezoelectric substrates 103 under the same condition as that of FIG. 8, and amplitude z at each position on the supporting board 102 is shown. In the drawing, amplitude z is increased in the order of z0, z1, z2 and z4. However, even when the pair of piezoelectric substrates 103 are used as described above, since no piezoelectric substrates 103 are provided at the four corners in the lateral direction (direction Y), the four corners still remain as non-sensitive regions.

Amplitude z of the vibration generated by the piezoelectric substrate 103 depends on the length of the long and slender belt-shaped piezoelectric substrate 103 in the longitudinal direction. Therefore, when the entire side of the operation panel 101 or the supporting board 102 in the longitudinal direction is fixed to the piezoelectric substrate 103, the above problems are solved. However, when a common piezoelectric substrate 103, the length of which is shorter than that in the longitudinal direction, is used in order to enhance the mass production effect or when a tablet apparatus having a large inputting operation face is used, it is not always possible to fix the piezoelectric substrate 103 to the entire length in the longitudinal direction.

An amplitude of the vibration generated by the piezoelectric substrate 103 is proportional to the voltage applied upon the piezoelectric substrate 103. However, when the voltage applied upon the piezoelectric substrate 103 is raised, an electric power consumption is increased, and the manufacturing cost is also increased by using a high voltage circuit. Therefore, it is necessary to maintain the voltage to be lower than a predetermined withstanding voltage.

SUMMARY OF THE INVENTION

The present invention has been accomplished to solve the above problems of the prior art. It is an object of the present invention to provide a tablet apparatus in which the vibration of a predetermined amplitude is generated in all regions on the operation panel or the supporting board when a piezoelectric substrate, the length of which is limited, is used, so that an operator can positively obtain a feeling of inputting operation even at any input operating position.

In order to accomplish the above object, a tablet apparatus of the present invention is characterized by having the following arrangement:

(1) A tablet apparatus comprising:

an operation panel that includes an inputting operation face and has a rectangular shape;

a supporting board that supports the operation panel from a back of the operation panel and has a rectangular shape;

an inputting position detecting portion that detects an inputting operation onto the inputting operation face and a position of the inputting operating and outputs data of the position; and a first and second piezoelectric substrates, on a front face of which one of a pair of drive electrodes is provided and on a reverse face of which other of the pair of drive electrodes is provided, either the front face or the reverse face of which is fixed to the operation panel or the supporting board, which has a long and slender belt-shaped shape, a length of which is shorter than a length of one side in a longitudinal direction of the operation panel or the supporting board, respectively, wherein when the inputting operation onto the inputting operation face is detected, a drive voltage is applied upon the pair of drive electrodes and the operation panel or the supporting substrate is vibrated by the first and second piezoelectric substrates, which are expanding and contracting, so as to generate a feeling of the inputting operation, wherein the first piezoelectric substrate is fixed to vicinity of one end of a first side in a longitudinal direction along the first side of the operation panel or the supporting board along the first side, and the second piezoelectric substrate is fixed to vicinity of one end of a second side in a longitudinal direction along the second side, wherein the one end of the second side is diagonal with respect to the one end of the first side.

(2) The tablet apparatus according to (1) further comprising:

conductive layers respectively formed on the operating panel and the supporting board, which are laminated on each other with an insulating gap; and lead electrocodes electrically connected to peripheries of the conductive layers, respectively, wherein a detection voltage is applied to one of the lead electrocodes and an electric potential between the lead electrocodes, which varies when the conductive layers contacts each other, is detected by the inputting position detecting portion, and wherein a position of an inputting operation is detected based on the electric potential.

(3) The tablet apparatus according to (2) further comprising, a leader pattern electrically connected to the lead electrodes, which is guided out from a portion of one of the first side and the second side, and to which the corresponding first or second piezoelectric substrate is not fixed.

(4) A tablet apparatus comprising:
an operating panel that includes an inputting operation face;
a supporting board that supports the operation panel;
one of the operation panel and the supporting board has a shape constituted by four sides including a first side and a second side opposed to the first side;
a first piezoelectric substrate, a length of which is shorter than a length of the first side, fixed to vicinity of one end of the first side along the first side; and
a second piezoelectric substrate, a length of which is shorter than a length of the second side, fixed to vicinity of one end of the second side along the second side, wherein the one end of the second side is diagonal with respect to the one end of the first side.

(5) The tablet apparatus according to (4) further comprising:
conductive layers respectively formed on the operating panel and the supporting board, which are laminated on each other with an insulating gap; and
lead electrocodes electrically connected to the conductive layers, respectively,
wherein a detection voltage is applied to one of the conductive layers and an electric potential between the conductive layers, which varies when the conductive layers contacts each other, is detected, and wherein a position of an inputting operation is detected based on the electric potential.

(6) The tablet apparatus according to (5) further comprising,
a leader pattern electrically connected to the lead electrodes, which is guided out from a portion of one of the first side and the second side, and to which the corresponding first or second piezoelectric substrate is not fixed.

(7) The tablet apparatus according to (4), wherein one of the operating panel and the supporting board, to which the first piezoelectric substrate and the second piezoelectric substrate is fixed, has a rectangular shape.

(8) The tablet apparatus according to (4), wherein the first and second piezoelectric substrates are located between the operating panel and the supporting board.

(9) The tablet apparatus according to (4), wherein the first and second piezoelectric substrates have a sheet structure of a single layer.

(10) A tablet apparatus comprising:
an operating panel that includes an inputting operation face;
a supporting board that supports the operation panel;
one of the operating panel and the supporting board has a shape constituted by four sides including a first side and a second side opposed to the first side;
a first piezoelectric substrate that has a length shorter than a length of a first side and is fixed to the first side along the first side, wherein a center point of the first piezoelectric substrate in a longitudinal direction thereof is displaced from a center of the first side toward one end of the first side; and
a second piezoelectric substrate that has a length shorter than a length of a second side and is fixed to the second side along the second side, wherein a center point of the second piezoelectric substrate in a longitudinal direction thereof is displaced from a center of the second side toward one end of the second side,
wherein the one end of the first side is diagonal with respect to the one end of the second side.

DETAIL DESCRIPTION OF PREFERRED EMBODIMENTS

Figure 1:
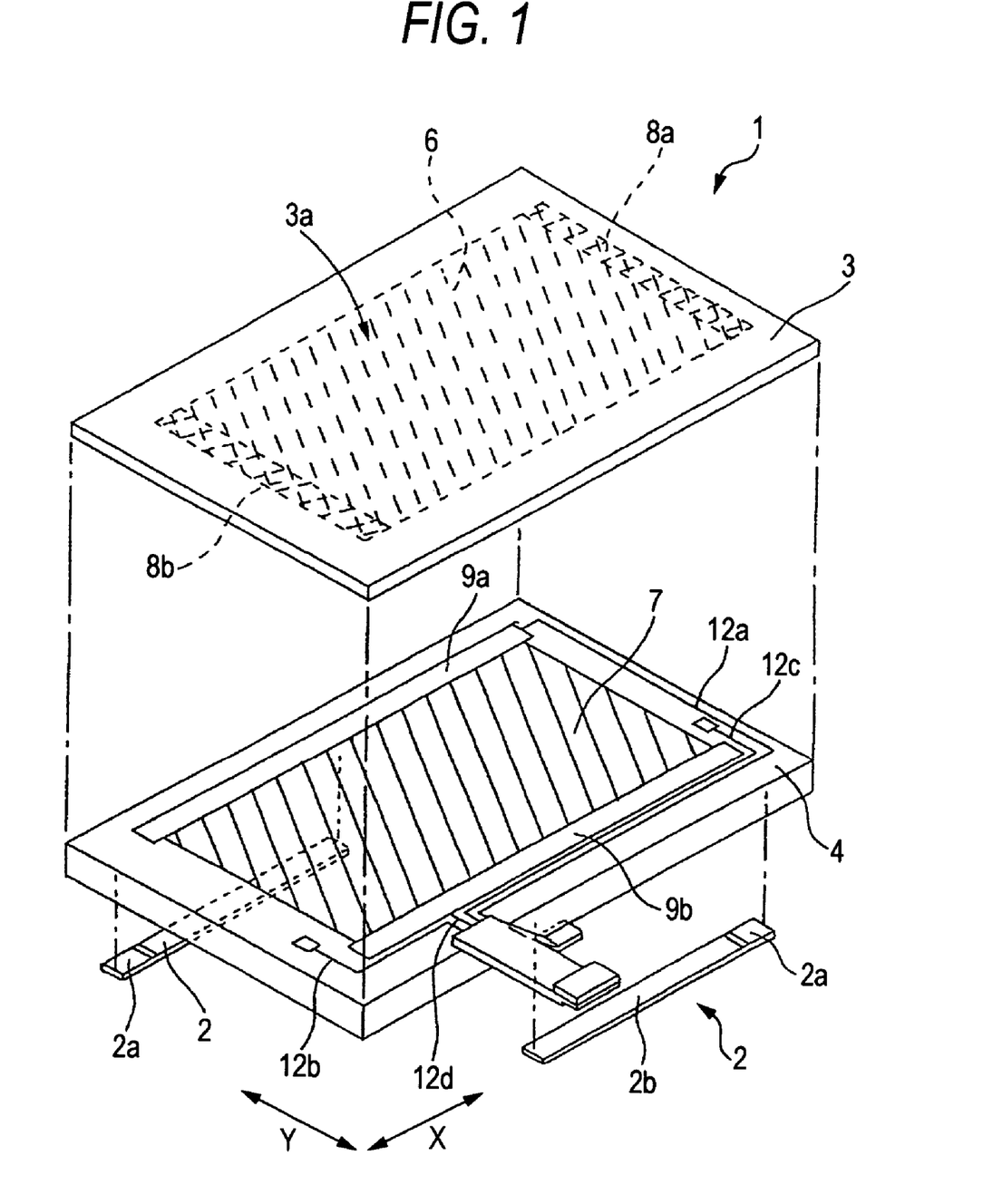
FIG. 1 is an overall exploded perspective view of the tablet apparatus 1 of the first embodiment of the present invention.
Figure 2:
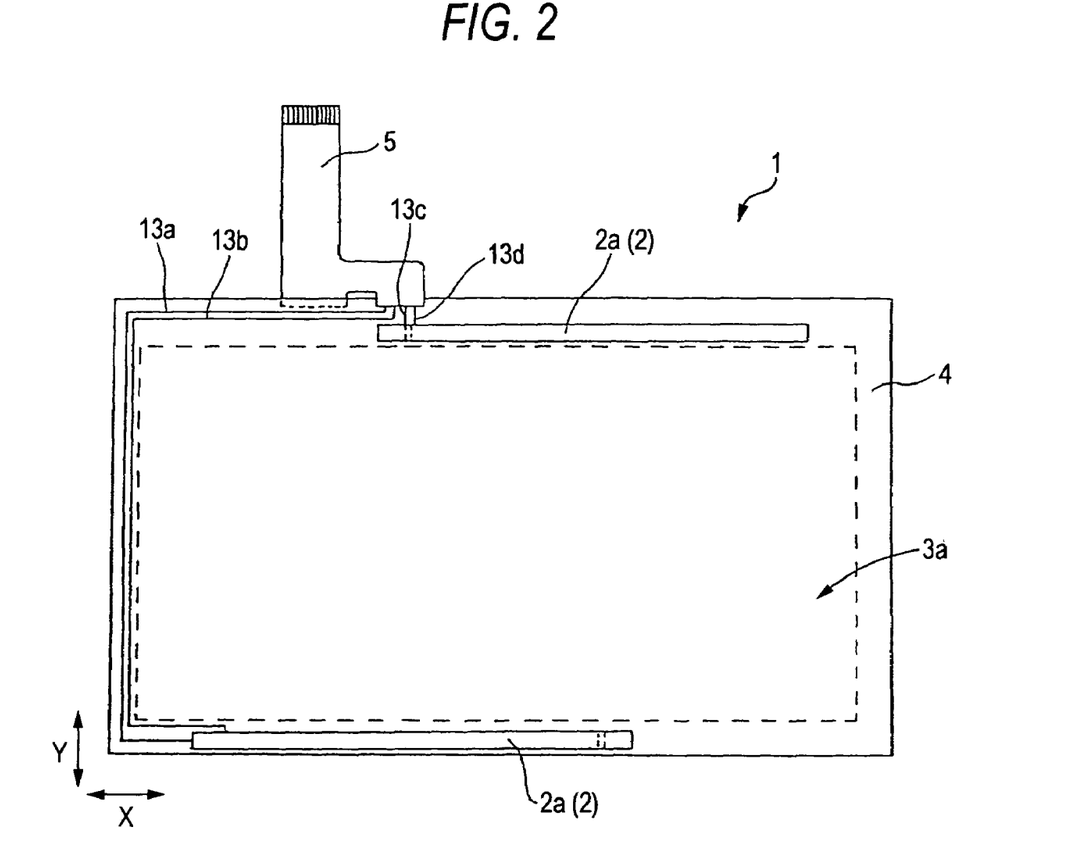
FIG. 2 is a bottom view of the tablet apparatus 1.
Figure 3:
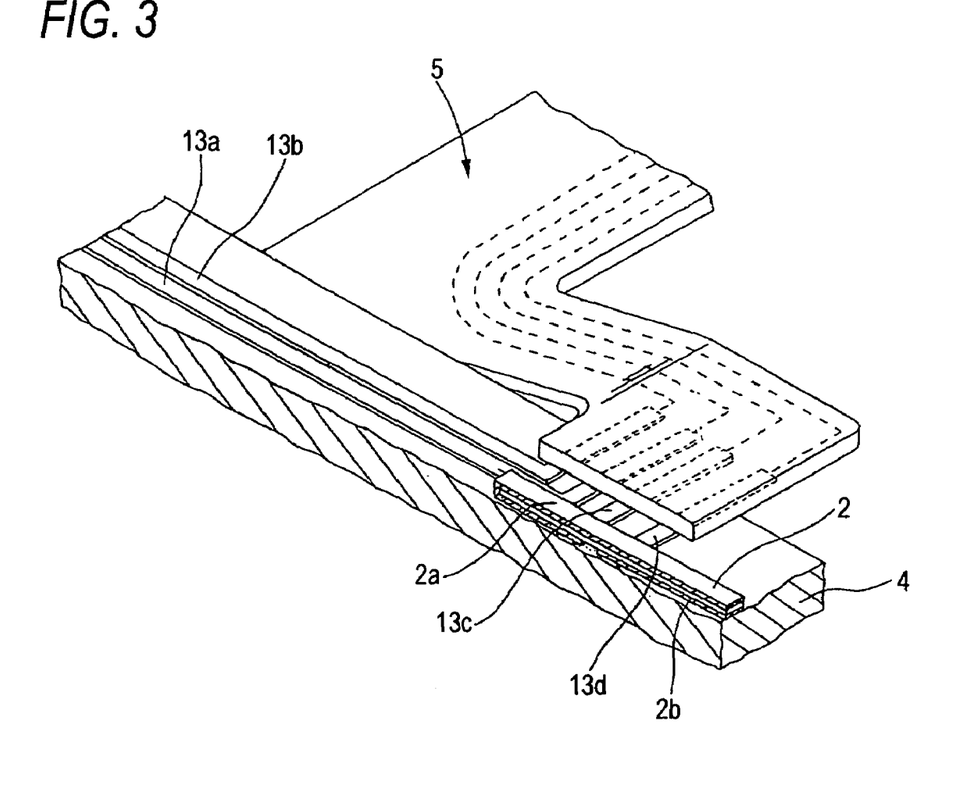
FIG. 3 is a partially exploded perspective view of a leader portion of the tablet apparatus 1.
Figure 4:
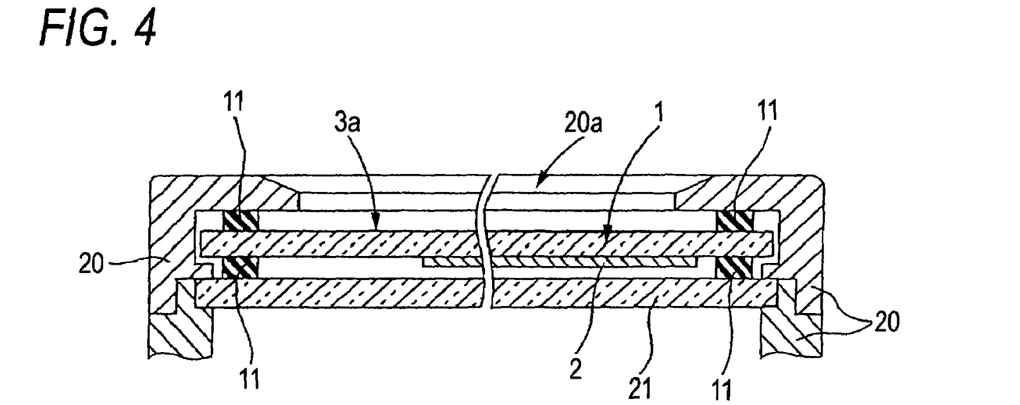
FIG. 4 is a longitudinally sectional view, in which some portions are omitted, showing a state in which the tablet apparatus 1 is attached to the housing 20.
Figure 5:
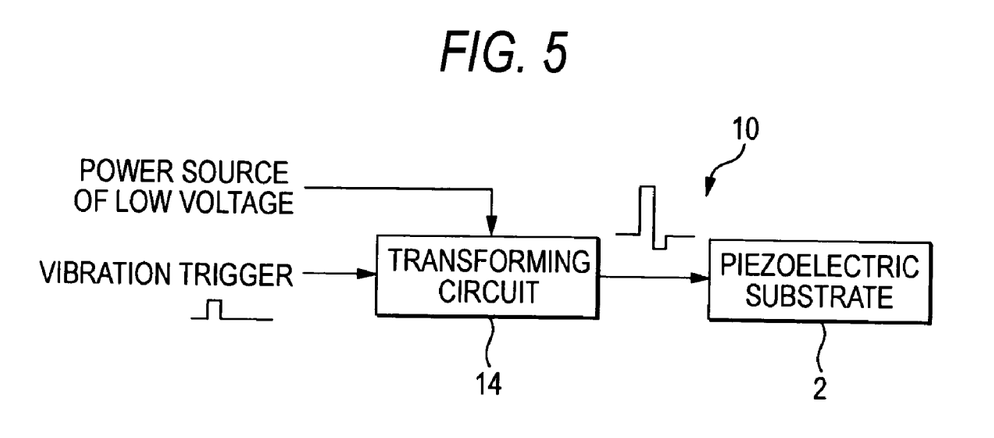
FIG. 5 is a block diagram showing a constitution of the drive circuit 10 for driving the piezoelectric substrate 2.
Figure 6:
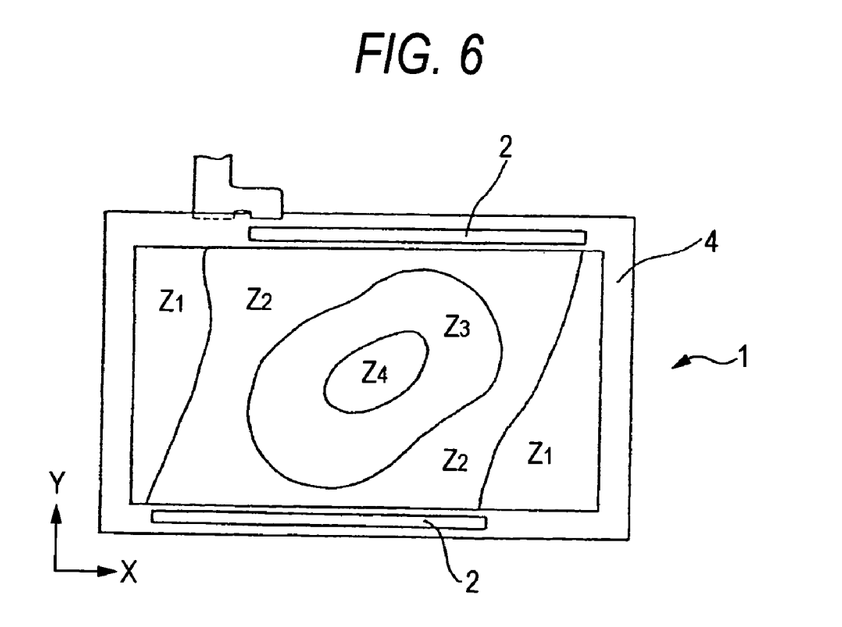
FIG. 6 is a schematic illustration showing amplitude z at each position on the supporting board 4 in the case where the supporting board 4, to which pair of piezoelectric substrates 2 is fixed from a diagonal position along the longitudinal direction, is vibrated.

Referring to FIGS. 1 to 6, the tablet apparatus 1 according to the first embodiment of the present invention will be explained below. The tablet apparatus 1 of this embodiment employs a so-called resistance pressure sensitive tablet system in which a conductive layer is provided which is composed of a uniform resistance film capable of forming the same electric potential gradient on the respective opposing face of the operation panel 3 and the supporting board 4 which are laminated on each other while leaving a small gap, and the input operating position is detected from an electric potential of the contacting position between the conductive layers at which the contact is made by the inputting operation. FIG. 1 is an exploded perspective view of the entire tablet apparatus 1, FIG. 2 is a bottom face view of the tablet apparatus, FIG. 3 is an enlarged perspective view of the leader portion, FIG. 4 is a longitudinal sectional view, in which some portions are omitted, showing a state in which the tablet apparatus 1 is attached to the housing 20 of the device, FIG. 5 is a block diagram showing a constitution of the drive circuit 10 for driving the piezoelectric substrate 2, and FIG. 6 is a schematic illustration showing a magnitude of the amplitude at each position when the supporting board 4 is vibrated.

The operation panel 3 is comprised of a flexible rectangular sheet made of transparent synthetic resin. In this case, the operation panel 3 is comprised of a flexible rectangular sheet made of PET (polyethylene terephthalate). Concerning the material of the operation panel 3, as long it can be slightly bent onto the supporting board 4 side as described later, any material can be used. However, in the case of the present embodiment in which a liquid crystal display panel (referred to as LCD panel hereinafter) arranged inside the supporting board 4 can be seen by an operator, a transparent material is used. In the case where rigidity is required for the operation panel 3, the operation panel 3 may be comprised of a glass plate or an acrylic plate. In the case where flexibility is required for the operation panel 3, the operation panel 3 may be made of PC (polycarbonate), PES (polyester sulfone) or PI (polyimide). A surface of the operation panel 3 is coated with a transparent hard coating agent (not shown) so that an upper face, which becomes an input operating face 3a, can be protected.

The supporting board 4 is composed of a transparent board made of soda lime glass, the profile of which is the same as that of the operation panel 3, that is, the supporting board 4 is formed into a rectangular sheet shape. The supporting board 4 is a board for supporting the operation panel 3, on which the inputting operation is conducted, from the back. Therefore, the supporting board 4 somewhat requires rigidity. However, in the case where the display section is not arranged inside, the supporting board is not necessarily made of a transparent material. When the material is somewhat rigid, not only a glass plate but also a plastic plate such as an acrylic base board and a metallic plate such as an aluminum or iron plate may be used.

The operation panel 3 and the supporting board 4 are laminated on each other by an adhesive layer, which is interposed in the peripheries of the operation panel 3 and the supporting board 4 while a small gap is formed between them. On the opposing face on which the operation panel 3 and the supporting board 4 are opposed to each other, the movable conductive layer 6 and the stationary conductive layer 7, which are transparent conductive films, are fixed to each other with a uniform film pressure. The movable conductive layer 6 and the stationary conductive layer 7 are respectively made of ITO (indium.tin oxide). When the movable conductive layer 6 and the stationary conductive layer 7 are provided with a uniform film pressure, a value of resistance per unit length can be made equal to each other at each position on the conductive layer.

On the stationary conductive layer 7, dot spacers (not shown) made of insulating synthetic resin are fixed at predetermined intervals. These dot spacers are provided for the prevention of erroneous contact of the movable conductive layer 6 with the stationary conductive layer 7 in the case where a portion of the input operating face 3a unexpectedly makes a contact with the hand of an operator. The height of each dot spacer is lower than the gap between the movable conductive layer 6 and the stationary conductive layer 7 which are separated from each other by the adhesive layer.

On the back of the operation panel 3, X applied side lead electrode 8a and X ground side lead electrode 8b are printed which are electrically connected with the movable conductive layer 6 at opposite circumferential edges in the direction X of the movable conductive layer 6 in FIG. 1. X applied side lead electrode 8a and X ground side lead electrode 8b are long and slender belt-shaped transparent conductive sheets made of silver. X applied side lead electrode 8a and X ground side lead electrode 8b are led out to the outer connecting section 5 of the supporting board 4 by the leader patterns 12a, 12b on the surface of the supporting board 4 which is opposed.

In the same manner, on the surface of the supporting board 4, Y applied side lead electrode 9a and Y ground side lead electrode 9b, which are electrically connected with the stationary conductive layer 7, are printed in the peripheries of the stationary conductive layer 7 in the direction Y perpendicular to the direction X in FIG. 1. Y applied side lead electrode 9a and Y ground side lead electrode 9b are long and slender belt-shaped transparent conductive sheets made of silver. Y applied side lead electrode 9a and Y ground side lead electrode 9b are respectively led out to the outside connecting section 5 by the leader patterns 12c, 12d on the surface of the supporting board 4 electrically connected by a conductive adhesive agent.

On the back of the supporting board 4, a pair of piezoelectric substrates 2 is fixed. The piezoelectric substrate 2 is a single layer substrate made of piezoelectric material such as piezoelectric monocrystals, piezoelectric ceramics represented by PZT (lead titanate and zirconate) porcelain, and polyvinylidene fluoride. In this case, a piezoelectric ceramic plate is used which is made of piezoelectric porcelain of PZT, the mechanical durability of which is high, and most widely used. The piezoelectric substrate 2 is formed into a long and slender belt-shaped sheet as shown in the drawing. When a drive voltage is applied on opposite sides of the piezoelectric substrate 2, a larger deformation can be generated by a low drive voltage.

One set of drive electrodes 2a, 2b for applying a drive electrode upon the piezoelectric substrate 2 are made in such a manner that conductive metallic material is deposited on opposite sides, which are opposed to each other, of the piezoelectric substrate 2 by means of vapor-deposition or screen printing and then fixed by means of burning. As shown in FIG. 3, one drive electrode 2a covering the back of the piezoelectric substrate 2 is folded back onto the surface on one side of the piezoelectric substrate 2 in the longitudinal direction. Therefore, the drive electrode 2a is exposed to the surface being distant from the other drive electrode 2b covering the surface while leaving a small insulating gap.

The drive electrodes 2a, 2b of a pair of piezoelectric substrates 2 are led out to the outside connecting section 5 by the leader patterns 13a, 13b, 13c, 13d respectively electrically connected to the back of the supporting board 4.

As shown in FIG. 2, pair of piezoelectric substrates 2 is shorter than the length of the rectangular supporting board 4 in the longitudinal direction. Each piezoelectric substrate 2 is fixed to one side (direction X) in the longitudinal direction from the vicinity of the diagonal position on the back of the supporting board 4. The vicinity includes the end of the side and the portion around the end. That is, the end of the piezoelectric substrate 2 may be aligned with the end of the side, and some clearance may be provided therebetween. When the piezoelectric substrate 2 is fixed to the supporting board 4, the drive electrodes 2a, 2b exposed to the opposing face are electrically connected to the leader patterns 13a, 13b, 13c, 13d. Therefore, a conductive adhesive agent is used here. However, in the case where these are connected to each other in another process, the conductive adhesive agent is not necessarily used. For example, various adhesive agents such as an adhesive agent made of epoxy or acrylate may be used for fixation.

In the present invention, vibration is generated on the supporting board 4 by utilizing the electrostriction effect of the piezoelectric substrate 2. Since the piezoelectric substrate 2 is directly fixed to the supporting board 4, when the piezoelectric substrate 2 is expanded and contracted, a high stress is generated on the supporting board 4 so that the vibration of a large amplitude can be generated. For example, when an electric field, the intensity of which is $10*10^5$ V/m, is applied upon piezoelectric material of PZT, the dielectric constant of which is 3400, the piezoelectric constant of which is $590*10^{-12}$ C/N, and the elastic compliance of which is $20*10^{-12} m^2/N$, a deformation of $5.9*10^4$ is caused. When this deformation is cramped, a high stress of $3*10^7$ N/m is generated.

When a drive voltage of ±280 V is applied between a set of drive electrodes 2a, 2b by utilizing the electrostriction effect, the vibration of a sufficiently large amplitude capable of being felt by an operator with the finger through the operation panel 3 can be generated on the supporting board 4. Especially, since the long and slender belt-shaped piezoelectric substrate 2 is bent in the longitudinal direction, when the piezoelectric substrate 2 is fixed to the supporting board 4 in the longitudinal direction, the entire supporting board 4 can be more effectively vibrated by large amplitude.

The outer connecting section 5 is composed of a flexible printed wiring board, one side of which is made to branch into two portions. One lead pattern of the branch portion is electrically connected to the leader patterns 12a, 12b, 12c, 12d on the surface, and the other lead pattern of the branch portion is electrically connected to the leader patterns 13a, 13b, 13c, 13d on the back. The other side of the outer connecting portion 5 is connected to a connector not shown. Due to the foregoing, the lead electrodes 8a, 8b, 9a, 9b are electrically connected to the inputting position detecting circuit described later, and the drive electrodes 2a, 2b are electrically connected to the drive circuit 10 of the piezoelectric substrate 2.

The leader patterns 12a, 12b, 12c, 12d connecting with the lead electrodes 8, 9 are connected to the outside connecting section 5 in a portion on one side (direction X) in the longitudinal direction of the supporting board 4 to which the piezoelectric substrate 2 is not fixed in parallel in the vicinity. As shown in the present invention, in the case where the piezoelectric substrate 2, which is shorter than the length in the longitudinal direction of the operation panel 3 and the supporting board 4, is fixed in a range from the vicinity of the diagonal position to the side along the longitudinal direction, since a portion to which the piezoelectric substrate 2 does not reach exists on one side in the longitudinal direction, by utilizing the portion, while the outside connecting section 5 and the supporting board 4 are being pressurized to each other, they are heated and the leader patterns 12a, 12b, 12c, 12d and the leader patterns of the outside connecting section 5 are connected to each other by a conductive adhesive agent. When operation is conducted as described above, the piezoelectric substrate 2 does not obstruct the connection work.

As shown in FIG. 4, in the tablet apparatus 1 composed as described above, the four corners of the rectangle are interposed between the housing 20 and LCD panel 21 through the elastic spacers 11 made of synthetic resin, and the tablet apparatus 1 is positioned and supported on LCD panel 21. When tablet apparatus 1 is positioned and supported, the operation panel 3 faces the window hole 20a of the housing 20. Accordingly, it is possible for an operator to conduct an inputting operation on the inputting operation face 3a with the finger while the operator is watching a display on LCD panel 21 through the window hole 20a.

The reason why the tablet apparatus 1 is supported through the elastic spacers 11 is described as follows. It is necessary to reduce a restriction of the vibration of the tablet apparatus 1, which is generated by the piezoelectric substrate 2, to be as small as possible. When these elastic spacers 11 are arranged at the four corners of the tablet apparatus 1, interference is not caused on the display on LCD panel 21.

Since the piezoelectric substrate 2 is a thin sheet structure comprised of a single layer, even when the drive electrodes 2a, 2b are fixed to opposite sides of the piezoelectric substrate 2, the thickness is not more than 1 mm. Therefore, the piezoelectric substrate 2 can be used as a vibration source without increasing the thickness of the tablet apparatus 1 and also without paying attention to a space in the housing 20 in which the piezoelectric substrate 2 is attached. Especially, even when the piezoelectric substrate 2 is fixed to the back of the tablet apparatus 1, since the thickness is not more than 1 mm, an interval between LCD panel 21 to be laminated and the tablet apparatus 1 is not increased, and the display of LCD panel 21 can be easily watched by the operator.

The inputting position detecting circuit (not shown) connected to the outside connecting section 5 via a connector detects an inputting operation conducted on the inputting operation face 3a of the operation panel 3 and also detects an inputting operation position. Further, the inputting position detecting circuit outputs the inputting position data. The operation of the inputting position detecting circuit will be explained below.

In the waiting state in which the inputting operation is not detected, a predetermined inputting operation detecting voltage is applied upon the X applied side lead electrode 8a or the X ground side lead electrode 8b, and the movable conductive layer 6 is maintained at this electric potential. Further, the stationary conductive layer 7 is grounded via a resistor, and the electric potential is monitored. While the operation panel 3 is not being operated by the inputting operation, an electric potential of the stationary conductive layer 7 is at the ground electric potential. When the conductive layers 6, 7 are contacted with each other by the inputting operation, an electric current flows from the movable electrode layer 6 to the resistor and the electric potential of the stationary conductive layer 7 is raised to a constant electric potential. Therefore, when the electric potential of the stationary conductive layer 7 exceeds the predetermined threshold value that is set in advance, it is detected that the inputting operation has been conducted on the operation panel 3.

When the inputting operation is detected, the inputting position detecting circuit is shifted to an operation mode in which the inputting operation position is detected. In this connection, by this inputting operating position detection, the drive circuit 10 for applying a drive voltage on the piezoelectric substrate 2 is also started. The action of this the drive circuit 10 will be described later.

When the inputting operating position is detected, the detection in direction X and the detection in direction Y are respectively made. At the time of detecting the inputting operating position in direction X, a voltage for detecting the coordinates is applied upon the X applied side lead electrode 8a, and the X ground side lead electrode 8b is grounded, so that an electric potential gradient of the same inclination can be formed on the movable conductive layer 6. When the stationary conductive layer 7 coming into contact with the movable conductive layer 6 is made to be high-impedance, the electric potential at the inputting operating position can be read out by the electric potential of the stationary conductive layer 7. An input obtained from the voltage detection circuit such as A/D converter is connected either the Y applied side lead electrode 9a or the Y ground side lead electrode 9b, and the electric potential at the contacting position is read out. Since the electric potential gradient of the same inclination is formed on the movable conductive layer 6, the electric potential at the contacting position becomes a proportional value to the distance in direction X directing from the X ground side lead electrode 8b to the X applied side lead electrode 8a. Due to the foregoing, X-coordinate at the inputting operating position is detected.

The inputting operating position detection in direction Y is conducted as follows by the same method as described above. On the stationary conductive layer 7, the electric potential gradient of the same inclination in direction Y is formed, and the electric potential at the contacting position is read out by the voltage detection circuit connected to the X applied side lead electrode 8a or the X ground side lead electrode 8b. The electric potential at the contacting position becomes a proportional value to the distance in direction Y directing from the Y ground side lead electrode 9b to the Y applied side lead electrode 9a. Due to the foregoing, Y-coordinate at the inputting operating position is detected.

As described above, the X and Y coordinates detection mode is repeatedly conducted, and the inputting operating position on the inputting operation face 3a is detected in directions X and Y, and the inputting position data made of X and Y coordinates is outputted into a processing device such as a personal computer not shown.

As long as the inputting operation into the operation panel 3 is detected, the tablet apparatus 1 repeats the inputting operation and the detection of the inputting operating position in the inputting position detecting circuit. However, when the inputting operation is detected for the first time in a state in which the inputting operation is not conducted, in order to vibrate the supporting board 4, the drive circuit 10 is started for applying a drive voltage on the piezoelectric substrate 2.

The drive circuit 10 is a simple circuit, for example, shown in FIG. 5. One set of drive electrodes 2a, 2b of the piezoelectric substrate 2 are connected to the output side of the transforming circuit 14 composed of a coil. When the inputting operation is detected, a vibration trigger signal, the width of which is 5 to 10 msec, is inputted into the transforming circuit 14. In the meantime, a DC voltage, the intensity of which is several volts, is applied upon the transforming circuit 14. Due to the foregoing, an induced voltage is generated by the coil in the transforming circuit 14. Therefore, a drive voltage of about ±280 V is applied upon the piezoelectric substrate 2.

FIG. 6 is a view showing the amplitude z in direction Z, which is perpendicular to the surface of the view, at each position in the case where the drive voltage of ±280 V is applied upon a pair of piezoelectric substrates 2, 2, which are fixed in a region from the diagonal position of the supporting board 4 to the side along the longitudinal direction, and the supporting board 4 is vibrated. The amplitude z is increased in the order of z0, z1, z2 and z4.

As shown in FIG. 6, since the supporting board 4 is supported by the elastic spacers 11 at the four corners, the vibration at the four corners is restricted as compared with other portions on the supporting board 4. However, a pair of piezoelectric substrates 2 is fixed in a region from the diagonal positions to the side in the longitudinal direction. Therefore, even at the four corners, either piezoelectric substrate 2 is surely arranged in the lateral direction (direction Y). The vibration of the piezoelectric substrate 2 in the lateral direction can be caused. Accordingly, it is possible to obtain the amplitude z1 by which an operator can feel a feeling of inputting operation.

Accordingly, even when the piezoelectric substrate 2, the length of which is shorter than the length of the supporting board 4 in the longitudinal direction, is used as a vibration source, the amplitude z, which is not less than a predetermined value, can be obtained on the entire supporting board 4. Due to the foregoing, when any position on the inputting operation panel 3a is operated for the inputting operation, the vibration of the supporting board 4 is transmitted to a fingertip of the operator via the operation panel 3 contacting at the inputting operating position. Therefore, the operator can positively realize that the inputting operation has been detected.

In the above embodiment, explanations are made into a so-called resistance pressure sensitive tablet type and analog type tablet apparatus 1. However, the present invention may be applied to various types of tablet apparatus such as a capacity coupling system, a magnetic coupling system, a contact system and an optical coupling system. In the above types of tablet apparatus, the present invention is not limited to a tablet apparatus in which the inputting operation is conducted by a fingertip but the inputting operation may be conducted by an indicating tool such as a stylus pen. In the case of the other type tablet apparatus, unless the detecting function at the inputting operating position is deteriorated, material of the operation panel 3 and the supporting board 4 is not limited to an insulating material but the operation panel 3 and the supporting board 4 may be made of an arbitrary material such as metallic material.

The piezoelectric substrate 2 is fixed to not only the back of the supporting board 4 but also the surface of the supporting board 4 opposing to the operation panel 3 and the surface or back of the operation panel 3.

The present invention is suitably applied to a tablet apparatus by which an operator can be informed of the recognition of the inputting operation by the vibration of the inputting operating position.

Of course, the present invention is not limited to the embodiment described above and shown in the drawings, and can be realized by any modification without departing from the scope of the invention.

For example, although, in the above embodiment, the operation panel 3 and the supporting board 4 have a rectangular shape, the shape may be any shape, such as trapezoids, parallelograms, and pentagons.

What is claimed is:

1. A tablet apparatus comprising:
    an operation panel that includes an inputting operation face and has a rectangular shape;
    a supporting board that supports the operation panel from a back of the operation panel and has a rectangular shape;
    an inputting position detecting portion that detects an inputting operation onto the inputting operation face and a position of the inputting operating and outputs data of the position; and
    a first and second piezoelectric substrates, on a front face of which one of a pair of drive electrodes is provided and on a reverse face of which other of the pair of drive electrodes is provided, either the front face or the reverse face of which is fixed to the operation panel or the supporting board, which has a long and slender belt-shaped shape, a length of which is shorter than a length of one side in a longitudinal direction of the operation panel or the supporting board, respectively,
    wherein when the inputting operation onto the inputting operation face is detected, a drive voltage is applied upon the pair of drive electrodes and the operation panel or the supporting substrate is vibrated by the first and second piezoelectric substrates, which are expanding and contracting, so as to generate a feeling of the inputting operation,
    wherein the first piezoelectric substrate is fixed to vicinity of one end of first side in a longitudinal direction along the first side of the operation panel or the supporting board along the first side, and the second piezoelectric substrate is fixed to vicinity of one end of a second side in a longitudinal direction along the second side, wherein the one end of the second side is diagonal with respect to the one end of the first side.

2. The tablet apparatus according to claim 1 further comprising:
    conductive layers respectively formed on the operating panel and the supporting board, which are laminated on each other with an insulating gap; and
    lead electrocodes electrically connected to peripheries of the conductive layers and, respectively,
    wherein a detection voltage is applied to one of the lead electrocodes and an electric potential between the lead electrocodes, which varies when the conductive layers contacts each other, is detected by the inputting position detecting portion, and
    wherein a position of an inputting operation is detected based on the electric potential.

3. The tablet apparatus according to claim 2 further comprising, a leader pattern electrically connected to the lead electrodes, which is guided out from a portion of one of the first side and the second side, and to which the corresponding first or second piezoelectric substrate is not fixed.

4. A tablet apparatus comprising:
an operating panel that includes an inputting operation face;
a supporting board that supports the operation panel;
one of the operating panel and the supporting board has a shape constituted by four sides including a first side and a second side opposed to the first side; and
a pair of piezoelectric substrates, wherein said pair of piezoelectric substrates comprises a first piezoelectric substrate and a second piezoelectric substrate,
wherein the first piezoelectric substrate, a length of which is shorter than a length of the first side, is fixed to vicinity of one end of the first side along the first side; and
wherein the second piezoelectric substrate, a length of which is shoter than a length of the second side, is fixed to vicinity of one end of the second side along the second side, wherein the one end of the second side is diagonal with respect to the one end of the first side.

5. The tablet apparatus according to claim 4 further comprising:
conductive layers respectively formed on the operating panel and the supporting board, which are laminated on each other with an insulating gap; and
lead electrocodes electrically connected to the conductive layers, respectively,
wherein a detection voltage is applied to one of the conductive layers and an electric potential between the conductive layers, which varies when the conductive layers contacts each other, is detected, and wherein a position of an inputting operation is detected based on the electric potential.

6. The tablet apparatus according to claim 5 further comprising, a leader pattern electrically connected to the lead electrodes, which is guided out from a portion of one of the first side and the second side, and to which the corresponding first or second piezoelectric substrate is not fixed.

7. The tablet apparatus according to claim 4, wherein one of the operating panel and the supporting board, to which the first piezoelectric substrate and the second piezoelectric substrate is fixed, has a rectangular shape.

8. The tablet apparatus according to claim 4, wherein the first and second piezoelectric substrates are located between the operating panel and the supporting board.

9. The tablet apparatus according to claim 4, wherein the first and second piezoelectric substrates have a sheet structure of a single layer.

10. A tablet apparatus comprising:
an operating panel that includes an inputting operation face;
a supporting board that supports the operation panel;
one of the operating panel and the supporting board has a shape constituted by four sides including a first side and a second side opposed to the first side; and
a pair of piezoelectric substrates, wherein said pair of piezoelectric substrates comprises a first piezoelectric substrate and a second piezoelectric substrate,
wherein the first piezoeiectric substrate has a length shorter than a length of a first side and is fixed to the first side along the first side, wherein a center point of the first piezoelectric substrate in a longitudinal direction thereof is displaced from a center of the first side toward one end of the first side; and
wherein the second piezoelectric substrate has a length shorter than a length of a second side and is fixed to the second side along the second side, wherein a center point of the second piezoelectric substrate in a longitudinal direction thereof is displaced from a center of the second side toward one end of the second side,
wherein the one end of the first side is diagonal with respect to the one end of the second side.

* * * * *